May 11, 1954 R. M. NORTH 2,678,276
PROCESS OF MAKING A CONFECTIONERY OF THE GUMDROP TYPE
Filed Sept. 20, 1951
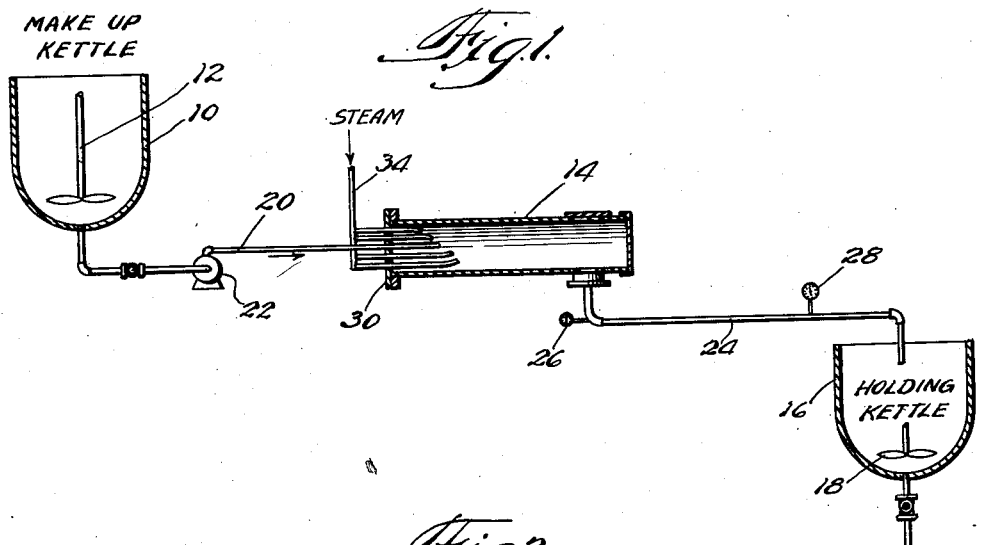
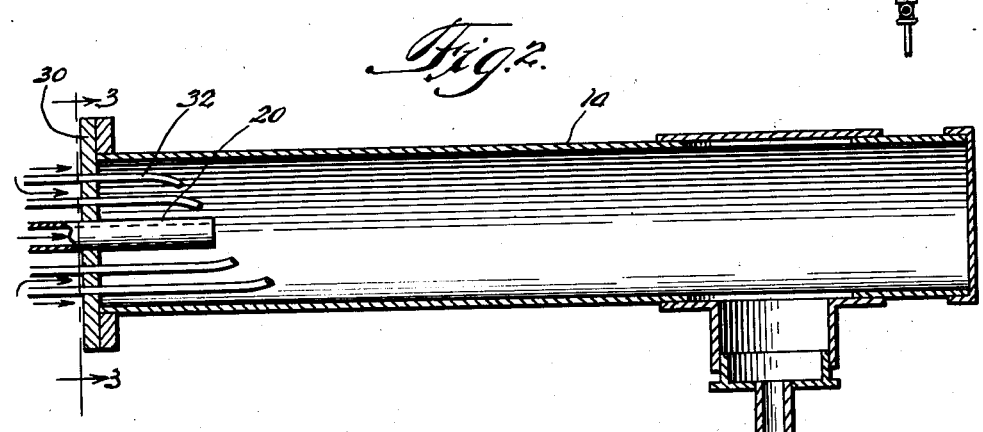
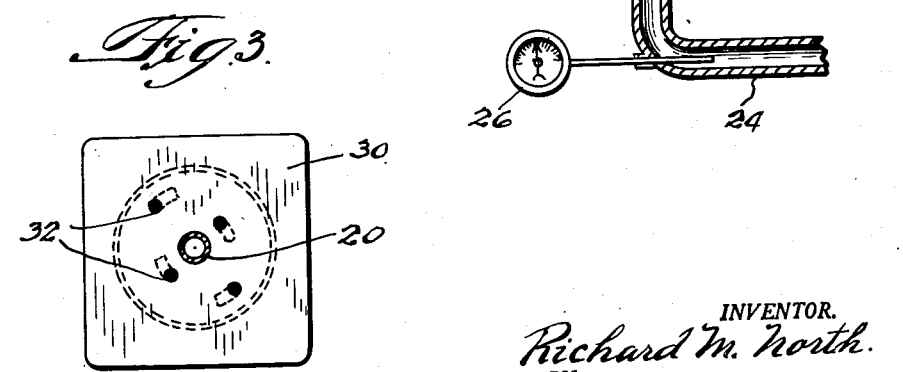
INVENTOR.
Richard M. North.
BY Patented May 11, 1954

2,678,276

UNITED STATES PATENT OFFICE 2,678,276

PROCESS OF MAKING A CONFECTIONERY OF THE GUMDROP TYPE

Richard M. North, Northfield, Ill., assignor to Farley Manufacturing Company, Skokie, Ill., a corporation of Illinois Application September 20, 1951, Serial No. 247,455

7 Claims. (Cl. 99—134)

This invention relates to a cooking process and more particularly to a process for cooking starch-base jelly products. This invention finds particular application in the manufacture of confectioneries of the gum type, such as gum drops, and other jellied candies having a starch base.

In the manufacture of jellied confectioneries of the gum drop type the several ingredients including water, sugar, starch and coloring agents are cooked by boiling together in steam-jacketed kettles in batch operations whereby the starch is gelatinized. In order to effect the proper gelatinization of the starch it has been necessary to employ in the initial mix at least three-fourths gallon, and usually more than one gallon, of water for each pound of starch. If lesser quantities of water are employed in the initial mix, it is not possible by boiling to obtain an ultimate product that has adequate gel strength. The large quantities of sugar present in mixtures of this type have a tendency to inhibit starch gelatinization in the cooking procedure. Accordingly, in the prior art processes it has been necessary to start out with a batch that has a large excess of water present and a considerable amount of heat energy is necessary to boil off this water in the cooking operation. Furthermore, in the prior art batch cooking processes considerable skill on the part of the candy maker is required and only experienced personnel are able to determine when the mass has been cooked to the proper degree. The methods that have been evolved by these operators include the observation of the stringiness of the mass during cooking. When the stringiness reaches a certain empirical value as determined by the character of the mass stringing from a paddle, then an experienced operator knows that the batch has been cooked to the proper degree. Of course undercooking or overcooking must be avoided if a satisfactory product is to be obtained. In addition, expensive equipment is necessary in carrying out the batch processes of the prior art.

Accordingly, an object of this invention is the provision of a continuous process for cooking a confectionery of the starch-base jellied type.

A further object of this invention is the provision of a continuous cooking process in which it is not necessary to boil off large quantities of water and wherein the amount of water employed in the initial mix to be cooked is substantially the same as that which finds its way into the final product.

A still further object of this invention is the provision of a cooking process which may be readily carried out by inexperienced personnel.

A still further object of this invention is the provision of a cooking process which may be effected in a simple form of apparatus that may be readily constructed from available materials.

A still further object of this invention is the provision of an improved cooking process for starch-base jellied candies which results in an extremely clear final product.

A still further object of this invention is the provision of a cooking process for jellied confectioneries which may be readily adapted to existing equipment.

Further and additional objects will appear from the following description, the accompanying drawing and the appended claims.

In accordance with one embodiment of this invention, a cooking process for starch-base jellied confectioneries has been devised which comprises cooking a dispersion of water, sugar and starch under pressure and at a temperature substantially above 212° F. A feature of the process is that the initial dispersion to be cooked is made up with substantially the amount of water that is eventually desired in the final jellied product, it having been discovered that large quantities of water are not necessary if the cooking is effected at superatmospheric pressures and temperatures as contemplated within the scope of this invention.

Generally speaking, the amount of water that is present in the mixture to be cooked is such that the ratio of starch to water is between about 4½ and 7½ pounds of starch for each gallon of water. The cooking is preferably effected by contacting a stream of the starch-water-sugar dispersion with a stream of high pressure steam whereby the temperature of the dispersion is raised to a value preferably between about 250° and about 300° F. This temperature is maintained for a relatively short period which may range from a matter of a few seconds (e. g. eight seconds) up until about one minute. During this short period at these elevated temperatures and pressures the starch becomes thoroughly cooked and the cooked mixture is discharged from the cooking zone to a zone of lower pressure and temperature from which it is withdrawn to the usual molding or casting operations.

For a more complete understanding of this invention, reference will now be made to the accompanying drawing, in which Fig. 1 is a diagrammatic view showing an apparatus for carrying out the process of this invention;

Fig. 2 is a sectional view of the cooking chamber, and

Fig. 3 is an end view taken along the line 3—3 of Fig. 2.

The apparatus shown in the drawings comprises a make-up kettle 10 equipped with a suitable stirrer 12, an elongated cooking chamber 14, and a holding kettle 16 equipped with a suitable stirrer 18. The make-up kettle 10 and the holding kettle 16 are preferably steam-jacketed (not shown). A valved conduit 20 including a positive displacement pump 22 is provided for conducting a preheated but uncooked charge from the make-up kettle into one end of the elongated cooking chamber 14. Similarly a conduit 24 provided with a temperature gauge 26 and a pressure gauge 28 serves to discharge cooked material from the opposite end of the chamber 14 to the holding kettle 16.

The cooking chamber in the embodiment shown is about 24 inches in length and has an internal diameter of about 4 inches. The conduit 20 having an internal diameter of about ¾ inch extends through an end plate 30 into the chamber 14 for a distance of about 5 inches. Surrounding the conduit 20 and extending through the face plate 30 are a plurality of steam injection conduits 32 supplied by a single steam line 34. In the embodiment shown there are four of these steam lines each having an internal diameter of about ¼ inch and terminating, respectively, 2, 4, 6 and 8 inches from the plate 30 within the chamber 14. The ends of the ducts 32 are slightly turned, e. g. about 15°, in order to provide a swirling action when high pressure steam is introduced into the chamber 14.

In carrying out the process of this invention a large batch of a sugar, water and starch dispersion is made up in the kettle 10. Heat is applied to the kettle in order completely to dissolve the sugar and permit the rapid dispersion of the starch in the mixture during the operation of the stirrer 12. Suitably the temperature in the make-up kettle is raised to about 190° to 200° F. A suitable formulation for the ingredients mixed in the kettle 10 is as follows:

| | |
|---|---|
| Sucrose (cane or beet sugar) lbs | 100 |
| Dextrose hydrate (cerelose) lbs | 50 |
| Corn syrup (42°–43° Baumé) lbs | 50 |
| Confectioners' cooking starch lbs | 30 |
| Water gallons | 6 |

The preheated dispersion is then continuously pumped through conduit 20 into the cooking chamber 14 and at the same time steam at a pressure of between 70 and 80 pounds is passed through line 34 and ducts 32 into the chamber 14. This steam is thoroughly mixed with the dispersion and immediately heats it to a temperature substantially in excess of 212° F. Preferably the steam is introduced at such a rate that the temperature reading on the thermometer 26 is maintained within the range of about 250° F. and about 300° F. If temperatures substantially above 300° F. are employed, the starch has a tendency to hydrolyze resulting in a product which will be gooey or viscid and unsuitable for use in gum drops or other jellied confectioneries. On the other hand, if temperatures substantially below about 250° F. are employed in the cooking zone, the starch is not sufficiently gelatinized and the final product does not have an adequate gel strength.

The stream of dispersion and steam are rapidly passed through the cooking chamber 14 and discharged through the one inch I. D. line 24 to the holding kettle 16 in which the pressure is reduced to substantially atmospheric and further cooking substantially ceases. The holding kettle merely provides convenient means for discharging the hot cooked product to suitable molding or casting equipment and for adding flavoring agents. In the manufacture of gum drops the molding or casting equipment includes starch molds into which the hot cooked mixture is discharged and allowed to set and cure for a number of hours prior to subsequent treatment.

The dispersion of starch, sugar and water may be passed through the cooking chamber 14 at a rate between about 15 and 100 pounds per minute which corresponds to a pressure cooking time for the dispersion of between about 10 seconds and one minute. While there is, of course, a time-temperature relationship in cooking operations of this general type, it has been found that there is a wide flexibility permissible with respect to the rate of flow of material through the cooking zone and the temperatures that are to be held therein. Thus a uniformly good product is obtained if the average time of the mixture in the cooking zone is more than just a few seconds but less than about one minute while the temperature is maintained within the range of between about 250° and about 300° F.

Thus it will be apparent that a cooking process has been provided which has a wide degree of flexibility such that it can be operated even by relatively unskilled personnel. Furthermore, the amount of water that is added to the initial batch is substantially the same as the amount that finds its way into the final product. Even though a portion of the steam may condense while passing through the pressurized cooking zone, a substantially equivalent amount will be flashed off when the cooked product is discharged to the holding kettle at substantially atmospheric pressure. A further advantage is that it is not necessary to expend a large amount of heat in boiling water off during the cooking operation as has been necessary in the prior art batch processes. Furthermore, the process is continuous and may be readily carried out in relatively inexpensive readily available equipment.

In the foregoing a specific formulation has been given for preparing a particular type of gum drop confectionery. However, it will be apparent that this formulation may be widely varied without departing from the spirit and scope of this invention. For example, the dextrose hydrate may be eliminated from the composition if desired. Likewise corn syrup may be eliminated or replaced by other syrups or substances which will tend to prevent the undesired crystallization of sucrose in the final product. Any suitable starch may be employed in the process of this invention which will gelatinize to produce a gel of adequate strength as will be readily apparent to one skilled in the art. Furthermore, as is customary, suitable coloring and flavoring agents, such as essential oils and citric acid, may be added. In the process of this invention the flavoring agents are preferably added to the cooked mixture in the holding kettle. Generally speaking, the coloring may be added either before or after cooking.

Inasmuch as an important application of this invention is in the confectionery art, it will be readily apparent that the dispersion or mixture cooked in accordance with this invention is one which has a high sugar content. The starch is in a relatively minor concentration but is, of course, necessary in order to cause the final product to be in the form of the desired gel. Generally speaking, the amount of starch employed in these formulations will vary between about 8 and 14 per cent by weight of the mass being cooked.

Also it will be apparent that the process is readily susceptible to automatic control of the cooking process. For example, the amount of steam introduced through line 34 may be regulated in accordance with any desired temperature recorded by thermometer 26.

While a particular embodiment of this invention is shown above, it will be understood, of course, that the invention is not to be limited thereto, since many modifications may be made, and it is contemplated, therefore, by the appended claims, to cover any such modifications as fall within the true spirit and scope of this invention.

I claim:

1. A process for manufacturing jellied confectioneries of the gum drop type which comprises mixing sugar, water and starch to form an aqueous dispersion, the ratio of starch to water being within the range of about 4½ to about 7½ pounds of starch for each gallon of water, cooking the resulting dispersion at between about 250° and about 300° F. under superatmospheric pressure for a period of less than one minute, and thereafter cooling said dispersion whereby to form a jellied confectionery.

2. A process for manufacturing jellied confectioneries of the gum drop type which comprises heating a mixture of sugar, water and starch to an elevated temperature below the boiling point of water at atmospheric pressure, the amount of starch in the mixture being between about 4½ and about 7½ pounds per gallon of water, continuously passing the heated mixture through a cooking zone whereby the mixture is heated to a temperature of between about 250° and about 300° F. at superatmospheric pressure for a period less than about one minute, continuously discharging cooked mixture from the cooking zone, and thereafter cooling said mixture to form a jellied confectionery having substantially the water-starch ratio within the range above specified.

3. A process of preparing a confectionery of the gum drop type which comprises preparing a dispersion of sugar, corn syrup, starch and water, the proportion of starch in the dispersion being between about 4½ and about 7½ pounds per gallon of water, passing a continuous stream of said dispersion through a cooking zone, passing high pressure steam into said cooking zone whereby the temperature of said stream is raised to between about 250° to about 300° F. at superatmospheric pressure, controlling the rate of flow of said stream through said cooking zone whereby to maintain said temperature for a period of less than about one minute, continuously discharging a cooked product from said cooking zone, and thereafter cooling the cooked product to form a jellied confectionery having substantially the starch-water ratio within the range above specified.

4. A process of making a confectionery of the gum drop type which comprises preparing a dispersion of sugar, water and starch, the ratio of starch to water in the dispersion being between about 4½ and about 7½ pounds per gallon, continuously flowing said dispersion through an elongated cooking zone whereby the dispersion is heated to a temperature between about 250° and about 300° F. under superatmospheric pressure, controlling the rate of flow of said dispersion through said cooking zone whereby said temperature of said dispersion is maintained for a period of less than about one minute and whereby said starch is gelatinized, discharging the resulting cooked product from said cooking zone and thereafter cooling without further cooking to form a jellied confectionery having a starch-water ratio within the range above specified.

5. A process of making a confectionery of the gum drop type which comprises preparing a dispersion of sugar, starch and water, the ratio of starch to water in the dispersion being between about 4½ and about 7½ pounds per gallon, continuously passing a stream of said dispersion and a stream of steam into one end of an elongated cooking zone in commingled relationship under superatmospheric pressure, continuously discharging the cooked dispersion from another end of said cooking zone, controlling the rate of flow of said streams into and through said cooking zone whereby the temperature of said dispersion is maintained at between about 250° and 300° F. for less than about one minute prior to discharge from said zone, and thereafter cooling the dispersion without further cooking to form a jellied confectionery having a starch-water ratio within the range above specified.

6. A process for manufacturing jellied confectioneries of the gum drop type which comprises preparing a dispersion consisting essentially of sugar, water and a gelatinizable starch, the amount of starch in said dispersion being between about 8 and 14 per cent by weight and the ratio of starch to water being between about 4½ and 7½ pounds of starch for each gallon of water, cooking the resulting dispersion at between about 250° and about 300° F. under superatmospheric pressure for a period of less than about one minute, and thereafter cooling said dispersion whereby to form a jellied confectionery.

7. The process recited in claim 4 wherein the amount of starch in said dispersion is between about 8 and about 14 percent by weight.

References Cited in the file of this patent

UNITED STATES PATENTS

| Number | Name | Date |
|---|---|---|
| 1,928,901 | Krno | Oct. 3, 1933 |
| 2,406,585 | Buchanan et al. | Aug. 27, 1946 |

FOREIGN PATENTS

| Number | Country | Date |
|---|---|---|
| 346,136 | Great Britain | Apr. 9, 1931 |